(12) United States Patent
Riordan et al.

(10) Patent No.: US 11,778,000 B1
(45) Date of Patent: Oct. 3, 2023

(54) EVENT SUBSCRIPTION IN DISTRIBUTED SESSION INITIATION PROTOCOL ARCHITECTURES

(71) Applicant: Junction Networks Inc., New York, NY (US)

(72) Inventors: John Riordan, Brooklyn, NY (US); Eric Tamme, Fort Collins, CO (US); Will Mitchell, Brooklyn, NY (US)

(73) Assignee: Junction Networks Inc., New York, NY (US)

( * ) Notice: Subject to any disclaimer, the term of this patent is extended or adjusted under 35 U.S.C. 154(b) by 216 days.

(21) Appl. No.: 14/224,133

(22) Filed: Mar. 25, 2014

Related U.S. Application Data

(60) Provisional application No. 61/804,954, filed on Mar. 25, 2013.

(51) Int. Cl.
*H04L 65/1104* (2022.01)

(52) U.S. Cl.
CPC .................. *H04L 65/1104* (2022.05)

(58) Field of Classification Search
CPC .................. H04L 65/1006; H04L 65/1104
See application file for complete search history.

(56) References Cited

U.S. PATENT DOCUMENTS

| | | | |
|---|---|---|---|
| 6,937,699 B1 | 8/2005 | Schuster et al. | |
| 7,835,352 B2 | 11/2010 | Zhu et al. | |
| 8,650,243 B2 | 2/2014 | Riordan et al. | |
| 8,705,518 B1* | 4/2014 | Afshar et al. | H04L 65/1046 370/353 |
| 9,979,795 B1* | 5/2018 | Tovino | H04L 67/10 |
| 2004/0015569 A1* | 1/2004 | Lonnfors et al. | H04L 67/14 709/220 |
| 2006/0018272 A1 | 1/2006 | Mutikainen et al. | |
| 2006/0167978 A1* | 7/2006 | Ozugur et al. | H04L 67/24 709/203 |
| 2008/0016157 A1* | 1/2008 | Sahraie et al. | H04L 43/0817 709/205 |

(Continued)

FOREIGN PATENT DOCUMENTS

| | | |
|---|---|---|
| RU | 2280275 C2 | 7/2006 |
| WO | 2008066867 A2 | 6/2008 |

OTHER PUBLICATIONS

International Preliminary Report on Patentability (Chapter I of the PCT), issued by the International Bureau in PCT Application No. PCT/US2012/023623, mailed Aug. 15, 2013, all enclosed pages cited.

(Continued)

*Primary Examiner* — Chris Parry
*Assistant Examiner* — Steven C Nguyen (57) ABSTRACT

Systems and methods for subscribing to receive published events and publishing events in a distributed session initiation protocol (SIP) network are provided. A request can be obtained from an event subscribing user agent (UA) to subscribe to receive events from another UA, and information regarding the event subscribing UA and the other UA can be stored in a local storage. Additionally, information regarding the other UA is stored in a global storage accessible to multiple components in the SIP network along with an identifier of a presence server storing the information. In this regard, when an event occurs relating to the other UA, the global storage is queried to determine one or more presence servers associated with UAs subscribed to receive events of the other UA, and the event information or a portion thereof is transmitted to the one or more presence servers.

12 Claims, 7 Drawing Sheets

(56) References Cited

U.S. PATENT DOCUMENTS

| | | | |
|---|---|---|---|
| 2008/0247381 A1 | 10/2008 | Bohm et al. | |
| 2008/0282254 A1 | 11/2008 | Blander et al. | |
| 2009/0300158 A1* | 12/2009 | Bobde et al. | H04L 29/06 709/223 |
| 2011/0074579 A1* | 3/2011 | Agulnik et al. | H04L 67/54 340/541 |
| 2011/0085654 A1* | 4/2011 | Jana et al. | H04L 12/5815 379/220.01 |
| 2011/0202607 A1* | 8/2011 | Ramamoorthy et al. | H04L 67/24 709/206 |
| 2012/0197964 A1 | 8/2012 | Riordan et al. | |
| 2012/0331075 A1* | 12/2012 | Salmi et al. | H04L 67/54 709/206 |
| 2014/0156858 A1 | 6/2014 | Riordan et al. | |

OTHER PUBLICATIONS

International Search Report and Written Opinion of PCT/US2012/023623 mailed Apr. 19, 2012, all enclosed pages cited.

\* cited by examiner

EVENT SUBSCRIPTION IN DISTRIBUTED SESSION INITIATION PROTOCOL ARCHITECTURES

PRIORITY CLAIM

This application is based upon and claims the benefit of U.S. Provisional Pat. Application Serial No. 61/804,954, filed Mar. 25, 2013, which is relied upon and incorporated herein by reference in its entirety.

BACKGROUND

Session initiation protocol (SIP) has become a widely-used signaling protocol for creating and managing multimedia communication services over a network, such as the Internet. Systems providing SIP communications typically employ components that identify SIP user agents and facilitate communications between the user agents. These components may include an outbound proxy, an inbound proxy, a registrar, and a user location service. Developments in SIP provide for an extensible framework by which user agents, also referred to as SIP nodes, can request notification from other user agents indicating the certain events have occurred. The notifications can occur using a publish/subscribe mechanism by which a presence user agent publishes events to a presence server for providing to subscribed agents.

A SIP system may be accomplished by a single SIP proxy server or other device that includes all of the components of the system, including the outbound proxy, the inbound proxy, the registrar, the user location service, the presence user agent, the presence server, etc. In such a scenario, however, the SIP proxy server may have a finite capacity, may be physically limited to deployment in a single location, and may not be cost effective. Alternatively, the SIP components may be scaled across various hardware components in order to distribute processing load of the services. Scaling in this manner, however, is still limited due to the relatively small number of SIP components that may be scaled or separated. Additionally, distributing the actual components across different systems or physical locations may cause one or more of the components to become inoperable or unusable.

SUMMARY

The following presents a simplified summary of one or more aspects to provide a basic understanding thereof. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

Aspects described herein relate to defining event subscription functionality for distributed session initiation protocol (SIP) architectures that use multiple instances of SIP proxies. An event subscribing user agent (UA) in a SIP network supported by a presence server can subscribe to receive events from one or more UAs), which can communicate using a different SIP proxy server than the event subscribing UA. When an event occurs for one of the UAs, its respective proxy server can indicate the event to a related presence user agent (PUA), which can determine one or more presence servers, including the presence server of the event subscribing UA, that have UAs subscribed to receive the events of the UA. The presence servers can include remotely located presence servers and/or presence servers that use a different SIP proxy to access the SIP network, local presence servers that use the same SIP proxy, etc. In any case, the PUA can accordingly publish events to the presence servers, and the presence servers can provide the events to their respective event subscribing UAs subscribed to receive events from the UA.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations may denote like elements.

DETAILED DESCRIPTION

Reference will now be made in detail to various aspects, one or more examples of which are illustrated in the accompanying drawings. Each example is provided by way of explanation, and not limitation of the aspects. In fact, it will be apparent to those skilled in the art that modifications and variations can be made in the described aspects without departing from the scope or spirit thereof. For instance, features illustrated or described as part of one example may be used on another example to yield a still further example. Thus, it is intended that the described aspects cover such modifications and variations as come within the scope of the appended claims and their equivalents.

Described herein are various aspects relating to providing event subscription in distributed session initiation protocol (SIP) architectures. For example, user agents (UA) in a SIP network can subscribe to receive events published by other UAs, though the UAs may traverse different proxy servers in accessing the SIP network. In this example, event subscribing UAs can subscribe to receive events related to UAs distributed across the SIP network. The event subscribing UAs can communicate a subscription request to a presence server in the SIP network, which can correlate to one or more proxy servers, and the presence server can store information regarding the subscription request in a global data store to identify a UA being subscribed to and at least the presence server. When an event occurs on the UA, its respective proxy server communicates information regarding the event to a presence UA (PUA). The PUA can determine the presence server (and/or additional presence servers) subscribed to receive events of the UA, and can publish the event the presence server(s). The presence server can receive the event publish and provide notification of the event, and/or related information, to the event subscribing UA. In one example, the presence server also stores subscription information in a local data store that indicates event subscribing UAs and respective UAs to which they are subscribed. Thus, the presence server can utilize the local data store in determining to communicate the event information from the PUA to the event subscribing UA.

Example distributed SIP architectures are described in U.S. Pat. Application No. 13/326,864, entitled "SYSTEM AND METHOD FOR GEOGRAPHIC SIP SCALING", and filed Dec. 15, 2011, and U.S. Pat. Application No. 13/612,144, entitled "SYSTEM AND METHOD FOR GEOGRAPHIC SIP SCALING", and filed Sep. 12, 2012, which are incorporated by reference herein for all purposes. In addition, details of developments in SIP architecture allowing dialog event publication/subscription can be found in RFC 3265, RFC 3903, and RFC 4235 issued by the Internet Engineering Task Force ("IETF") standards organization, which are also incorporated by reference herein for all purposes.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, the subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips...), optical disks (e.g., compact disk (CD), digital versatile disk (DVD)...), smart cards, and flash memory devices (e.g., card, stick, key drive...). Additionally it is to be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the subject matter.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
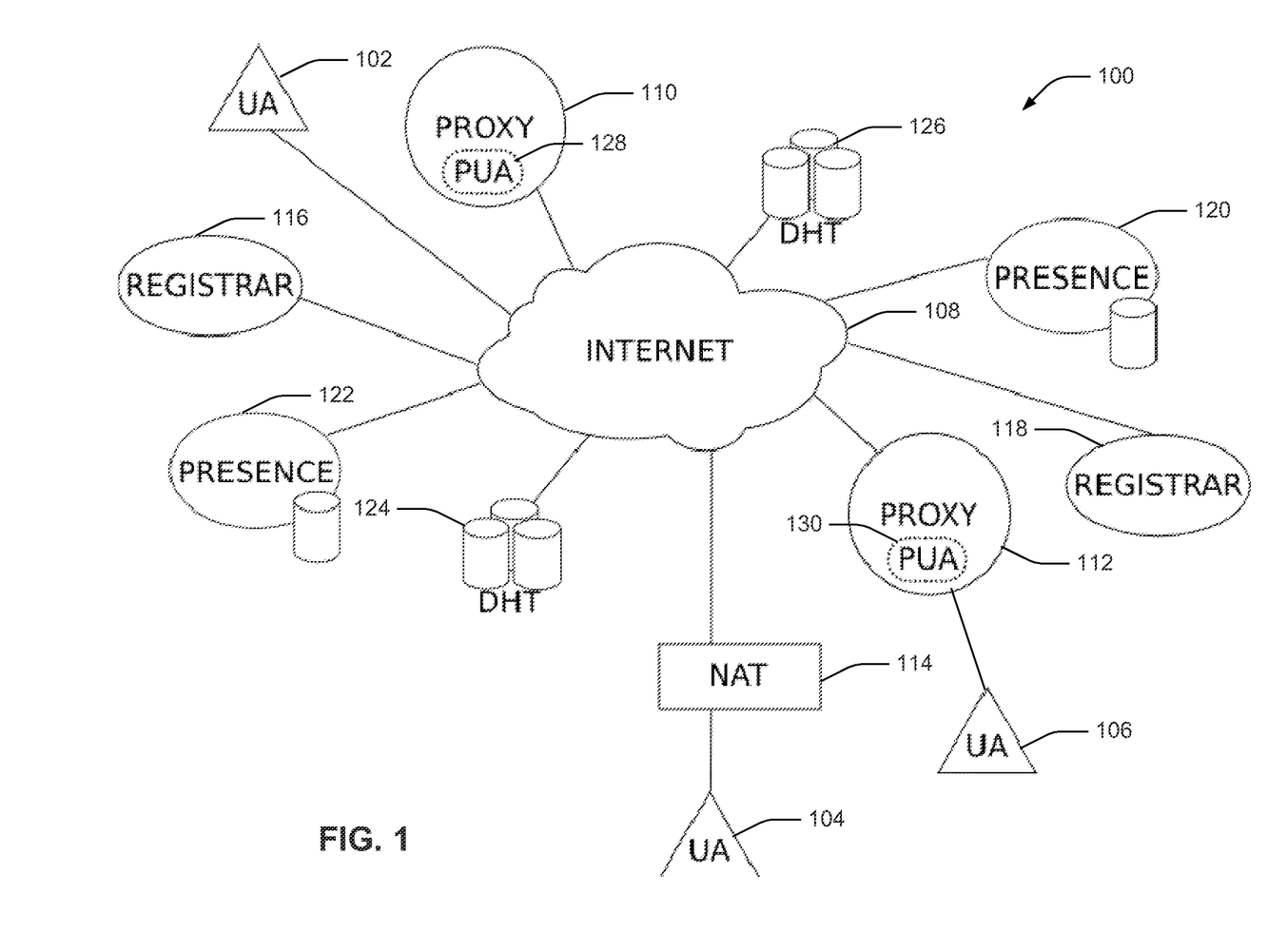
FIG. 1 is an aspect of an example system for facilitating subscribing to events of user agents (UA) published in a distributed session initiation protocol (SIP) network.

FIG. 1 illustrates an example system 100 for providing distributed SIP architecture functionality. System 100 includes a plurality of UAs 102, 104, and 106 that can communicate with one another over an internet 108. Internet 108 can include a collection of nodes communicatively coupled with one another via one or more components (e.g., switches, routers, bridges, gateways, servers, etc.), which can include, or can include access to, an Internet, but can also be an intranet, or other network. In an example, UAs 102, 104, and 106 can be located remotely from one another and can communicate in a SIP network using one or more proxy servers 110 and/or 112 as an entry point to the SIP network. As shown, the UAs 102, 104, and 106 can be located remotely from the proxy servers 110 and/or 112 as well, and in one example, can connect to internet 108 without physically connecting via a proxy server 110 and/or 112, though UA 106 is shown as physically connected to proxy server 112, as one example. In addition, in an example, UA 104 can connect to internet 108 via a network address translation (NAT) device 114, such as a router or other device or set of devices. The UAs 102, 104, and/or 106 can include one of a plurality of devices that can communicate in a SIP network, such as a computer (e.g., personal computer, server, etc.), a telephony device (e.g., a hardwired phone, wireless phone, mobile or cellular phone, satellite phone, etc.), a tablet, a person digital assistant, a digital video recorder, a network device, a webcam, a printer, and/or substantially any node that can communicate in a network and can generate and/or receive events, as described herein.

System 100 includes one or more registrars 116 and/or 118 as well, which can generate and store registration information for the UAs 102, 104, and 106 and/or other components of the SIP network. The registration information can include location and/or contact information for communicating with the UAs 102, 104, and 106 and/or other components of the SIP network, such as a proxy server 110 and/or 112 providing SIP network access to the UAs 102, 104, and 106 and/or other components. The location information can include an address of record (AOR), which can be a universal resource indicator (URI) that maps to one or more network addresses for communicating with the related UA. For example, when the UAs 102, 104, and 106 initialize on the network, a proxy server 110 and/or 112 can be associated with each UA 102, 104, and 106, and the proxy server 110 and/or 112 can communicate the registration information, including an identification of the UA 102, 104, 106 (e.g., AOR), and an identification of the proxy server to the registrar 116 and/or 118. The registrar 116 and/or 118 can store the information in a local or global data store. Thus, when UA 102, which can access the SIP network via proxy server 110, decides to communicate with UA 104, which can access SIP network via proxy server 112, proxy server 110 can determine that UA 104 accesses the SIP network via proxy server 112 (e.g., by querying registrar 116 and/or 118 or related data stores) and can accordingly route packets from UA 102 to UA 104 via proxy server 112.

System 100 also includes one or more presence servers 120 and/or 122, which can have associated local data stores. The one or more presence servers 120 and/or 122 allow the UAs 102, 104, and/or 106 to subscribe to receive notification of events from various other UAs. One or more distributed hash tables (DHT) 124 and/or 126 are shown to provide global storage of event subscription information. DHTs 124 and 126, for example, can be or include various types of storage, such as one or more relational databases, hierarchical storage files (e.g., extensible markup language), etc. or portions thereof, that can be centrally located, distributed across one or more entities or locations, and/or the like such to allow remote access by various components of the SIP network. For example, presence server 120 and/or 122 can receive a subscription request from a UA 102, 104, and/or 106, which can traverse a related proxy server 110 and/or 112. Presence server 120 and/or 122 can store event subscription information in DHT 124 and/or 126, such as information regarding the UA for which notification of events is requested (e.g., an AOR) and at least information regarding the presence server 120 and/or 122. In addition, the presence server 120 and/or 122 can store event subscription information in a local data store, such as an identification of the UA for which notification of events is requested and an identification of the UA subscribing to receive the events (and/or a proxy server thereof) to facilitate forwarding events received from the UA for which notification of events is requested to the UA requesting event subscription.

Furthermore, system 100 includes presence UAs (PUA) 128 and/or 130, which can be optionally included by proxy servers 110 and/or 112, and used to publish events of one or more UAs. In an example, PUA 128 and/or 130 can obtain an event notification from a respective proxy server 110 and/or 112 and can query DHT 124 and/or 126 to determine one or more presence servers 120 and/or 122 subscribed to receive events of the UA. In addition, the PUA 128 and/or 130 can publish the event information to DHT 124 and/or 126 to allow presence servers 120 and/or 122 to obtain current event information for notifying of a latest event (e.g., for subscribers subscribing during or after the event occurred). The PUA 128 and/or 130 can publish event information to the identified presence server(s) 120 and/or 122, which can distribute the event information to notify related subscribed UAs, as described. Though shown as implemented within a proxy server, it is to be appreciated that PUA 128 and/or 130 can exist as another component connected to internet 108. In addition, components shown as separate from other components can be combined on a similar server, in some examples.

According to an example, UA 102 can subscribe to receive events of by UA 104. In this example, UA 102 can communicate a subscription request to presence server 122 (e.g., via proxy server 110), and presence server 122 can store subscription information in DHT 124 including identification information for UA 104 (e.g., AOR) and presence server 122. In addition, for example, presence server 122 can store subscription information locally as well, such as information regarding UA 104 and UA 102 (and/or proxy server 110). When events occur for UA 104, proxy server 112 can notify PUA 130 of the events. PUA 130 can then query DHT 124 and/or 126 to determine one or more presence servers subscribed to receive published event information for UA 104, and can determine that at least presence server 122 is to receive such event information. PUA 130 can accordingly publish event information to the presence server 122, which can include an identifier of UA 104, an event type, one or more parameters related to the event, and/or the like.

In this example, presence server 122 can receive the event information and can determine to notify UA 102 (e.g., and/or proxy server 110) of the event information based on querying a local data store that includes subscription information correlating UA 104 with UA 102. In one example, upon receiving subscription information from UA 102, presence server 122 can also have received information regarding proxy server 110 or other routing information for communicating event information to UA 102. Accordingly, presence server 122 can communicate the event information to UA 102 using the routing information (e.g., by including a routing header to proxy server 110 that specifies identification information for UA 102, etc.). In yet another example, presence server 122 can be implemented by proxy server 110, and thus can retain information for communicating with UA 102 without storing such routing information.

Figure 2:
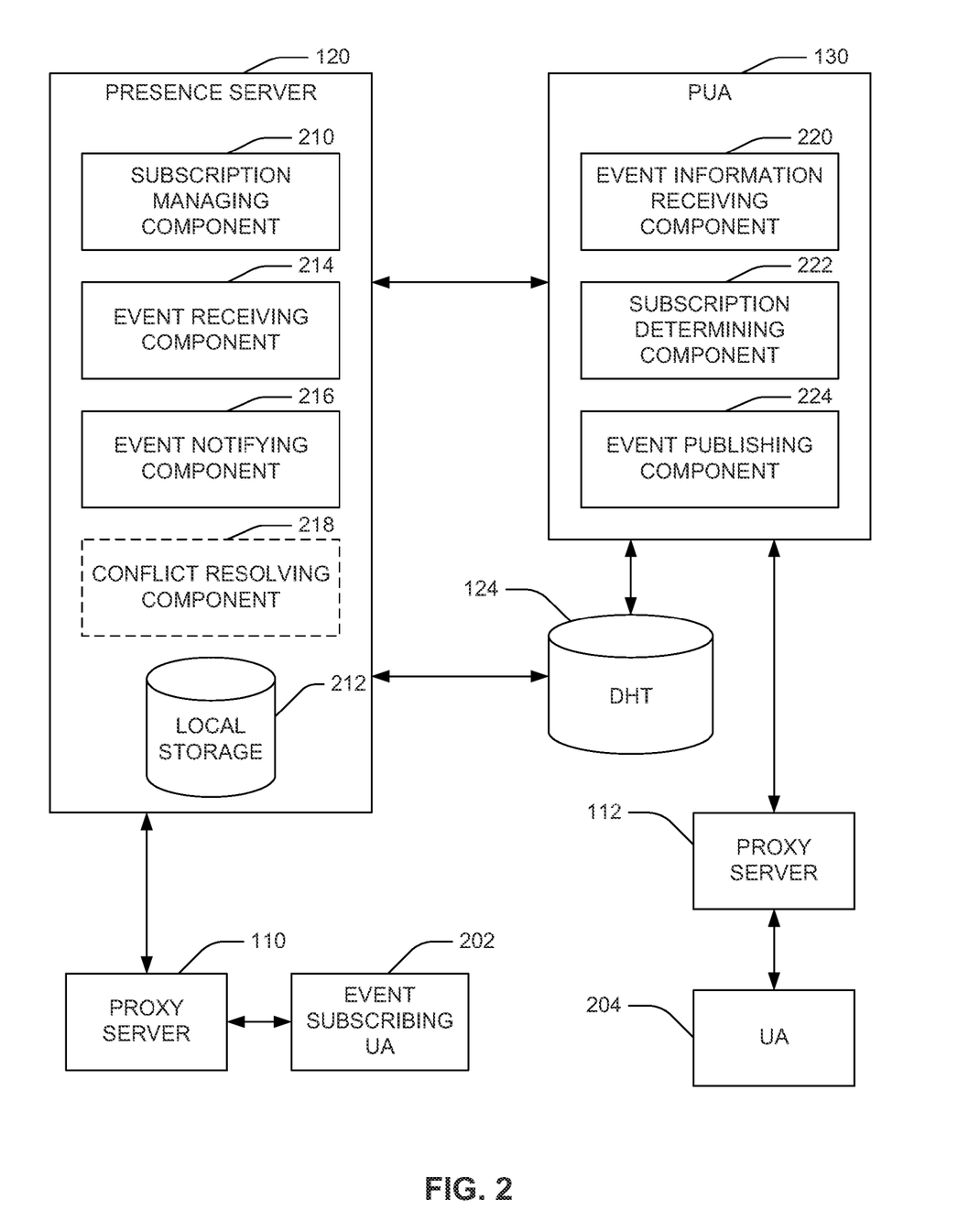
FIG. 2 is an aspect of an example system for storing and retrieving subscription information to deliver published events to appropriate UAs.

FIG. 2 illustrates an example system 200 for providing event subscription in distributed SIP networks. System 200 includes a presence server 120 for managing event subscriptions of one or more UAs, and a PUA 130 for publishing event information of one or more UAs, as described herein. Presence server 120 and PUA 130 can communicate over a distributed SIP network, as described. System 200 also includes a DHT 124 that the presence server 120 and PUA 130 can use to store and retrieve subscription and/or event information. System 200 also includes an event subscribing UA 202 that can subscribe to receive events from one or more UAs in the SIP network, and a UA 204, events of which can be published in a SIP network. In one example, event subscribing UA 202 can communicate with presence server 120 and/or one or more other components of a SIP network via proxy server 110. In addition, UA 204 can communicate in the SIP network via proxy server 112, which may include or otherwise communicate with PUA 130. Additionally, for example, proxy server 110 may include presence server 120, though not shown. Moreover, in an example, though not shown, proxy servers 110 and/or 112 may be the same proxy server in the distributed SIP network. As described above, certain components of the SIP network can be combined in a single server and/or location, or distributed over multiple servers.

Presence server 120 includes a subscription managing component 210 for maintaining subscription information for UAs subscribing to receive published events of other UAs in a DHT 124, local storage 212, and/or the like, an event receiving component 214 for obtaining event information from a PUA regarding one or more events, and an event notifying component 216 for transmitting the event information to one or more subscribing UAs. Presence server 120 optionally includes a conflict resolving component 218 for managing conflicts in published event information as received and/or as stored in local storage 212 (and/or DHT 124). PUA 130 can include an event information receiving component 220 for obtaining information regarding one or more events published for a UA, a subscription determining component 222 for discerning one or more presence servers having UAs subscribed to receive events published for the UA (or generally any UAs publishing events to PUA 130), and an event publishing component 224 for publishing event information to the discerned presence servers for providing notification to one or more UAs communicating therewith.

According to an example, event subscribing UA 202 can subscribe to receive events published by UA 204, though the UA 204 participates in the same distributed SIP network via different components (e.g., a different proxy server, presence server, PUA, etc.). In this example, event subscribing UA 202 can communicate a subscribe request to the presence server 120 (e.g., via proxy server 110) that specifies an AOR or other identifier of UA 204. Subscription managing component 210 can receive the subscribe request from the event subscribing UA 202 and can store information regarding the subscribe request in DHT 124 and/or local storage 212. For example, the information can include the AOR of UA 204, an address of a proxy server or PUA 130 related to UA 204 (which can be obtained from a registrar, in one example), identification information of the event subscribing UA 202 (e.g., AOR, address of proxy server 110, etc.), information of the presence server 120 (e.g., a network address), and/or the like.

In one example, where UA 204 has established a dialog branch for publishing events with PUA 130, as described further herein, event receiving component 214 can determine whether events of the UA 204 have recently been, or are currently being, published by the PUA 130 (e.g., by querying local storage 212 and/or DHT 124 for related event publication information) as a part of processing the subscribe request from event subscribing UA 202. If so, event notifying component 216 can provide the recent (or last) event information published by UA 204 to event subscribing UA 202 (e.g., by routing the event information via proxy server 110) in a notify message. In addition, for example, conflict resolving component 218 can resolve conflicts between event information published for multiple events of UA 204 in DHT 124 by PUA 130 (e.g., multiple events received by UA 204 within a period of time) based at least in part on a timestamp on the conflicting event information, related event types, and/or the like. When conflicting events are resolved, conflict resolving component 218 can update DHT 124 and/or local storage 212, in one example, with event information of one of the events determined to be current or more accurate than the other events. It is to be appreciated that the conflict resolving component 218 can be present in additional or alternative components, such as PUA 130 to resolve conflicts as event information is received from a single or related UAs 204. Moreover, conflict resolving component 218 can resolve conflicts between event information published in DHT 124 and/or event information stored in local storage 212 (as described further herein) in determining event information to provide to the event subscribing UA 202.

Once subscription managing component 210 stores subscription information for an event subscribing UA 202, presence server 120 can notify event subscribing UA 202 of published events received for the associated UAs. For example, UA 204 can establish a dialog branch with another UA (not shown) for communicating therewith. Proxy server 112 can detect certain aspects of the dialog branch establishment, maintenance, termination, etc., and can accordingly report related events of UA 204 to PUA 130. Event information receiving component 220 can obtain the associated event information from proxy server 112, which can include an event type, one or more related parameters, etc. The event information can comprise a dialog information body, as referred to herein, which can indicate the event type, associated parameters, and/or other information regarding the event. In one example, event information receiving component 220 can store the event information, or a portion thereof, in DHT 124 (e.g., for obtaining by a presence server 120 or other presence servers in determining and/or resolving current event information when processing a subscribe request from a UA for events of UA 204).

In addition, subscription determining component 222 can determine one or more presence servers having associated UAs subscribed to receive events of UA 204 (and/or generally for UAs associated with PUA 130, proxy server 112, etc.). In an example, subscription determining component 222 can query the DHT 124 to determine the one or more presence servers. As described, presence server 120 can have registered to receive published events of UA 204 by storing subscription information in the DHT 124 that specifies an association between the UA 204 (e.g., and/or a determined PUA 130 or proxy server 112) and presence server 120. Accordingly, in this example, subscription determining component 222 can obtain the subscription information from DHT 124 and determine to publish the event information regarding the event to presence server 120. Event receiving component 214 can obtain the event information from PUA 130. Event notifying component 216 can determine one or more UAs associated with presence server 120 that are subscribed to receive events of UA 204. For example, the obtained event information can include an identifier (e.g., AOR) of UA 204, which event notifying component 216 can use to determine the one or more UAs subscribed to receive the event information. Event notifying component 216 can query local storage 212, in one example, to determine the one or more UAs, including event subscribing UA 202, that are subscribed to receive events from UA 204, and can accordingly publish the event information thereto, which can include the identifier of UA 204, an event type, one or more event parameters, etc. In one example, the event information can also include information for routing the event information based at least in part on determining proxy server 110 related to event subscribing UA 202 (e.g., based on querying a registrar, information stored in local storage 212, an association between presence server 120 and proxy server 110, etc.).

In addition, in an example, event notifying component 216 can store the event information in local storage 212, which the event receiving component 214 can query for determining whether the received event is the most relevant event to publish. For example, conflict resolving component 218 can resolve conflicts in the local event information stored in local storage 212 for a given UA 204 where multiple events are stored in local storage 212 and are timestamped within a given period of time. In this example, conflict resolving component 218 can purge at least some of the events based on comparing timestamps thereof, comparing event types, comparing event parameters, and/or the like. For example, conflict resolving component 218 can remove events that are outside of a threshold time from a more current event. In another example, conflict resolving component 218 can reconcile the events to select certain event types over others.

In one example, a priority of event types for reconciling conflicting event information can be EARLY, PROCEEDING, CONFIRMED, and TERMINATED, such that EARLY events are selected to represent a current event where conflicting events exist over PROCEEDING, CONFIRMED, or TERMINATED events. Event notifying component 216 can notify event subscribing UA 202 of a relevant event, and in one example, conflict resolving component 218 can remove the other conflicting event information. This can occur upon event receiving component 214 obtaining an event publish from PUA 130, subscription managing component 210 receiving a subscribe request, and/or the like. Thus, for example, conflict resolving component 218 can resolve conflicts in event information as received by event receiving component 214, event information stored in local storage 212, event information stored in DHT 124, etc.

In a specific example, UA 204 can send an invite to another UA (e.g., via proxy server 112) to establish a dialog therewith. Proxy server 112 can detect the invite and/or a related state change of UA 204 to a PROCEEDING state. Proxy server 112 accordingly indicates a dialog create event to PUA 130, which receives the event and/or related information (e.g., the state) via event information receiving component 220 and accordingly publishes information regarding the event to one or more presence servers for notifying subscribed UAs, as described. The other UA can accept the invitation, and a related event can be communicated to proxy server 112 for providing to UA 204. This can result in another state change to EARLY. In either case, proxy server 112 detects the state change and communicates the event to PUA 130 for publishing to the one or more presence servers. UA 204 can enter a CONFIRMED state based on further communications with the other UA, which proxy server 112 can detect and again communicate to PUA 130 for publishing to the one or more presence servers. UA 204 or the UA to which it has established the dialog can eventually terminate the dialog, which proxy server 112 can detect as a state change to TERMINATED for the UA 204, and can communicate the state change event to PUA 130 for publishing to the one of more presence servers. It is to be appreciated that for a given dialog between UAs, additional dialogs can be branched within the given dialog for different communicates between the UAs, and each dialog creation, termination, and/or related intermediary events can be communicated to UAs subscribed to receive the events, as described.

In another specific example, it is to be appreciated that event subscribing UA 202 can determine to communicate a subscribe request to presence server 120 for specific events of UA 204 (e.g., as opposed to any and all events). In this regard, subscription managing component 210 can communicate additional subscription information to DHT 124 to specify the certain events for which event subscribing UA 202 is subscribing. In this example, subscription determining component 222 can determine presence servers having UAs subscribed to receive events from UA 204 based on an event type of an event received from UA 204, and can publish event information to those presence servers based on the event type, which can notify respective UAs (e.g., UA 202) of the events of the certain type.

Figure 3:
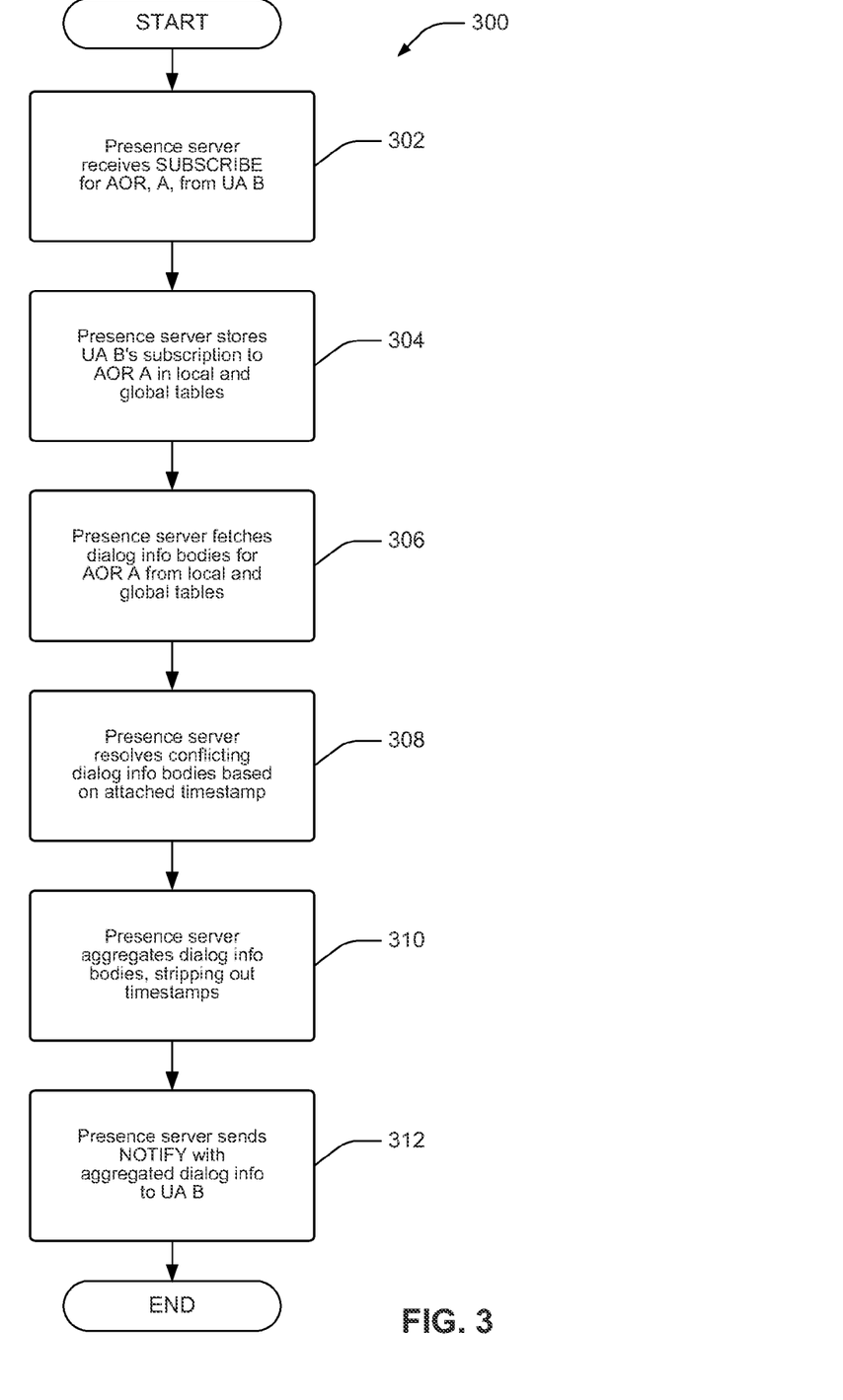
FIG. 3 is an aspect of an example methodology of a presence server storing subscription information related to an event subscribing UA.
Figure 4:
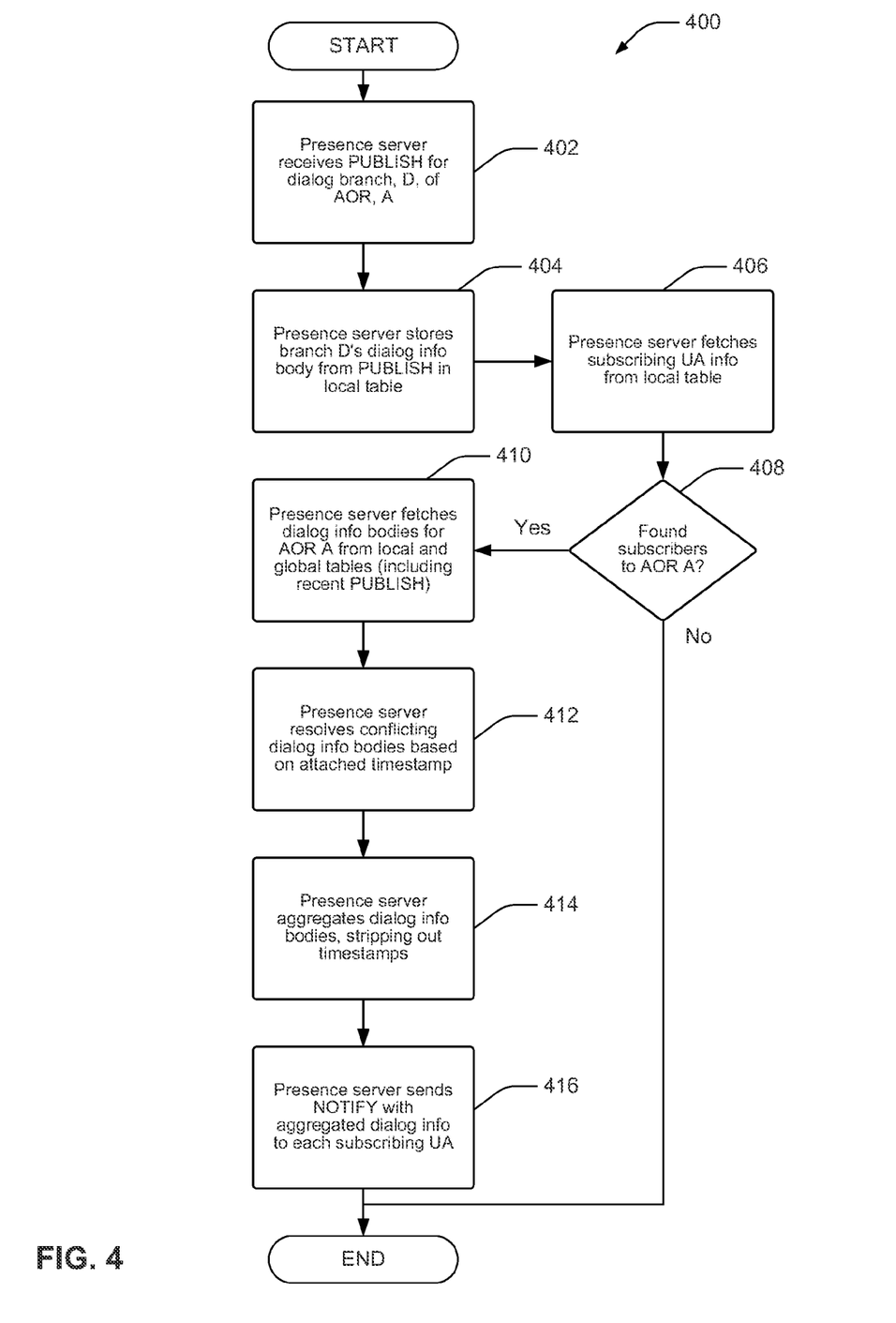
FIG. 4 is an aspect of an example methodology of a presence server providing events to an event subscribing UA subscribed to receive the events.
Figure 5:
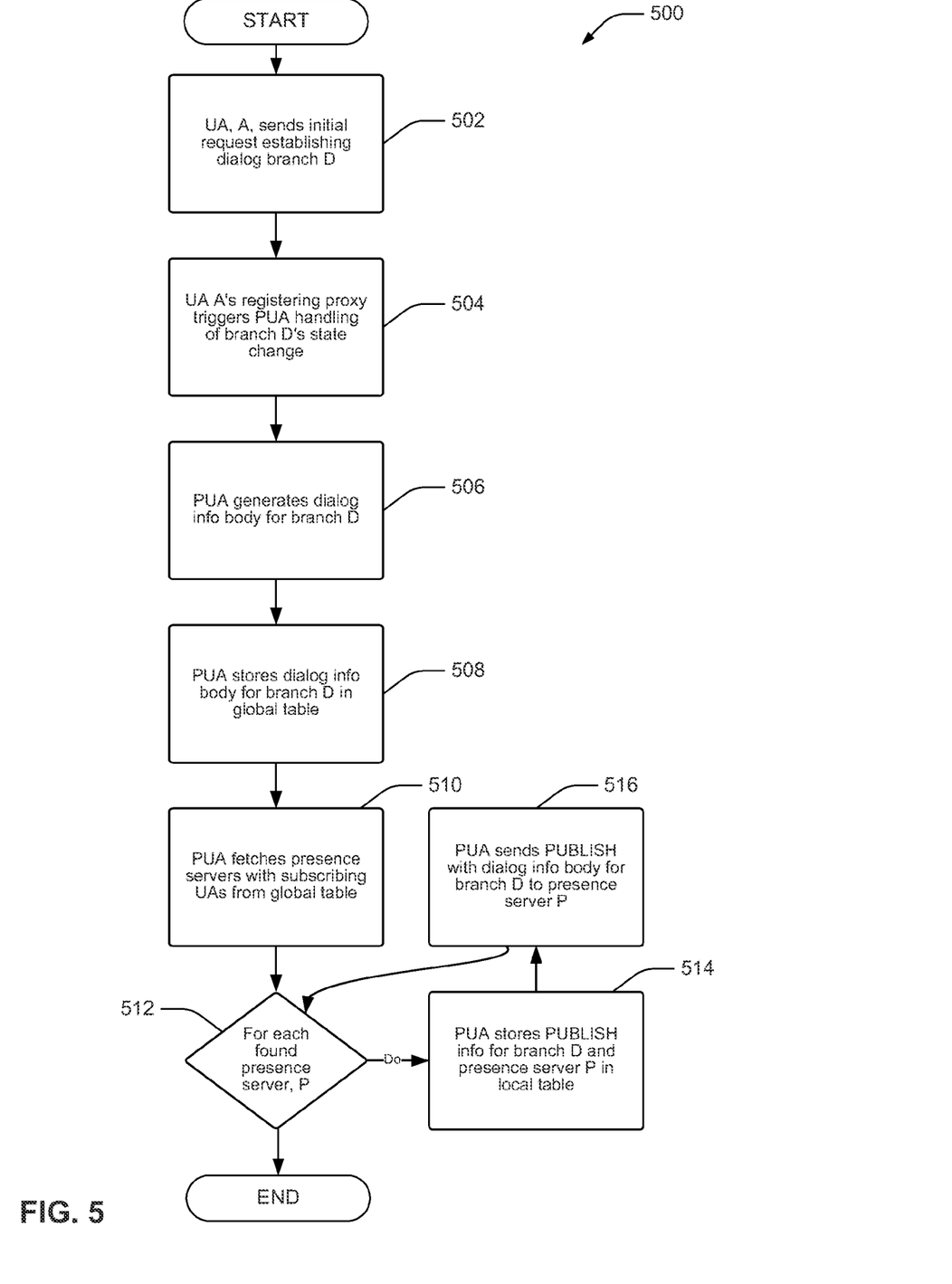
FIG. 5 is an aspect of an example methodology of a presence UA for publishing events to one or more presence servers.

Referring to FIGS. 3-5, methodologies that can be utilized in accordance with various aspects described herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 3 illustrates an example methodology 300 for managing subscriptions at a presence server. At 302, a subscribe for an AOR of a UA A can be received from a UA B at a presence server. At 304, the presence server can store UA B's subscription to AOR A in local and global tables. As described, this can include storing an identifier of the UA B, presence server, UA A, etc. in local storage, DHTs, etc. to resolve locations for communicating event publications. At 306, the presence server can also fetch dialog information bodies for AOR A from local and global tables. For example, UA A can have established a dialog branch with another UA, and thus, the presence server can determine information bodies (e.g., which may include event information) from the local or global tables to provide to UA B based on receiving the subscribe request. These can relate to the latest or most relevant last published events by UA A. At 308, the presence server resolves conflicting dialog information bodies based on attached timestamp. As described, the local and global tables can include conflicting information. Timestamp, event type, and/or event parameters can be analyzed to determine which dialog information body is the most relevant, current, etc. At 310, the presence server can aggregate the resolved dialog information bodies and strip out timestamps, and at 312 can send a notify with aggregated dialog information to UA B.

FIG. 4 illustrates an example methodology 400 for publishing events received by a presence server. At 402, the presence server receives a publish for a dialog branch, D, of AOR A. As described a UA A can open a dialog branch another UA, and the PUA related to UA A can publish this event to presence servers having UAs registered to receive events of UA A. Thus, at 402, the presence server receives notification of the dialog branch. At 404, the presence server can store branch D dialog information body from the publish in a local table. For example, this can include storing information in the publish, such as an identifier of UA A, the dialog information body, an event type, one or more event parameters, etc. At 406, the presence server can fetch subscribing UA information from the local table. For example, the presence server can have stored information in the local table regarding UAs subscribing to receive events of UA A, and can determine the UAs at 406. If subscribers are found at 408, the presence serve fetches dialog information bodies for AOR A from the local table and global tables at 410 (e.g., which can include the publish received at 402). The presence server can resolve conflicts in the dialog information bodies, as described, based on an attached timestamp at 412. Thus, for example, where AOR A has multiple dialog information bodies (e.g., within a period of time), the presence server can reconcile the dialog information bodies based on the timestamp, an event type, event parameters, etc. At 414, the presence server aggregates dialog information bodies and strips out the timestamps, and at 416 can send a notify with aggregated dialog information to each subscribing UA. This can include information of the dialog branch D, as described.

FIG. 5 illustrates an example methodology 500 for publishing events in a distributed SIP network. At 502, UA A sends initial request establishing dialog branch D (e.g., with another UA). The dialog branch allows UA A to communicate with another UA in the SIP network. At 504, UA A's registering proxy can trigger PUA handling of branch D's state change. As described, the UA A can register in a SIP network and be associated with a proxy server as an entry point into the SIP network. The proxy server can also function as a PUA, as described herein, and thus obtains events from UA A for publishing to one or more presence servers. At 506, the PUA generates a dialog information body for the branch D. This can include generating event information, as described herein, based on the event of the UA A (e.g., an identifier of UA, an event type, event parameters, etc.). At 508, the PUA stores the dialog information body for branch D in the global table. Thus, presence servers can obtain such information to provide subscribing UAs (e.g., in the middle of the publish event or otherwise as a current or last published event). At 510, the PUA fetches presence servers with subscribing UAs from the global table. As described, the presence servers can have stored subscription information for the UAs in the global table, such that the PUA can determine to publish event information to the presence servers for communicating to the UAs subscribed to receive notification of events of UA A. At 512, for each presence server P found in the global table, the PUA stores publish information for branch D and presence server P in a local table at 514, and sends a publish with a dialog information body for branch D to presence server P at 516. In this regard, each presence server receives the dialog information body related to UA A, and can forward related event details to subscribing UAs.

Figure 6:
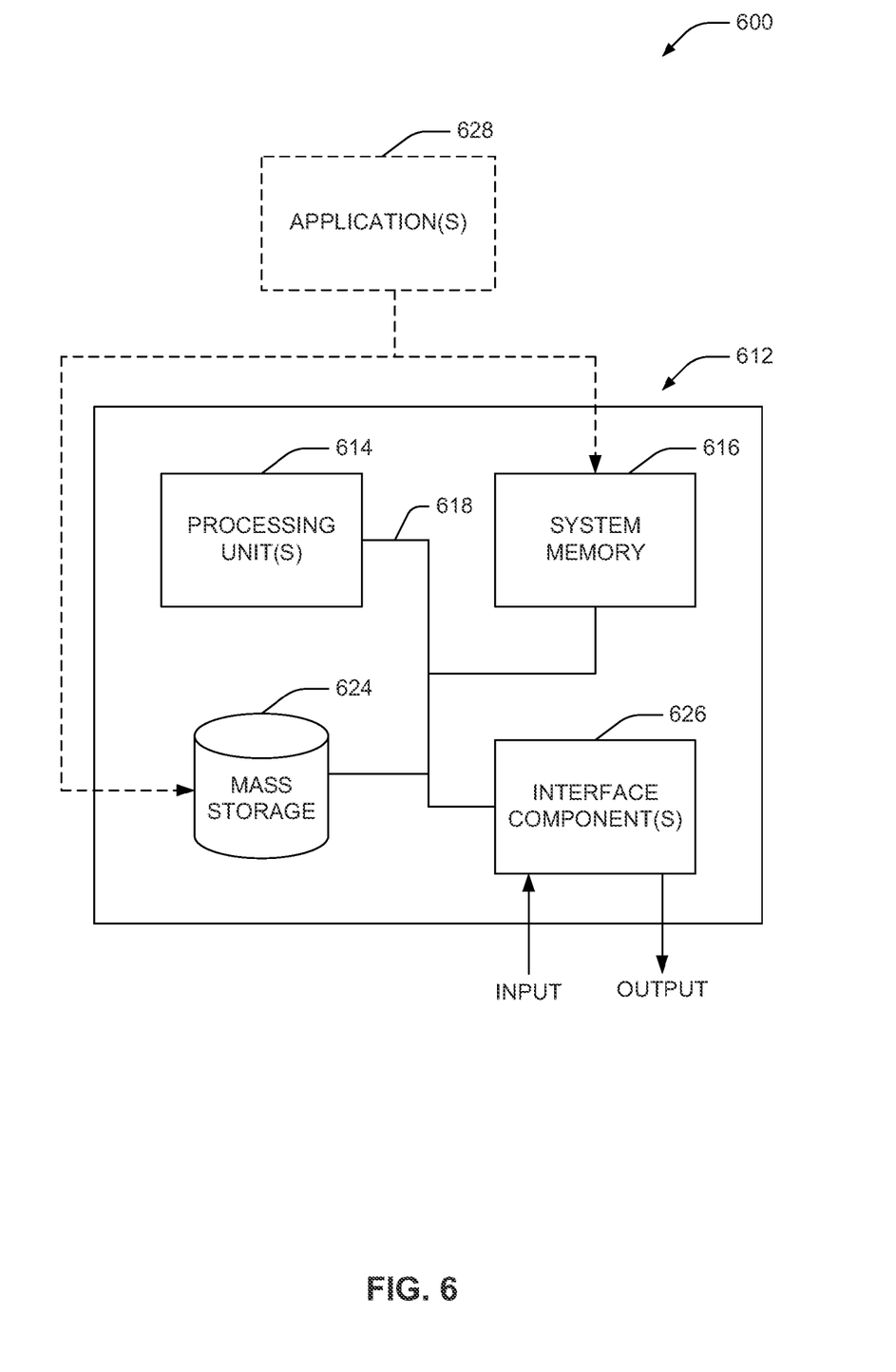
FIG. 6 is an aspect of an example system in accordance with aspects described herein.
Figure 7:
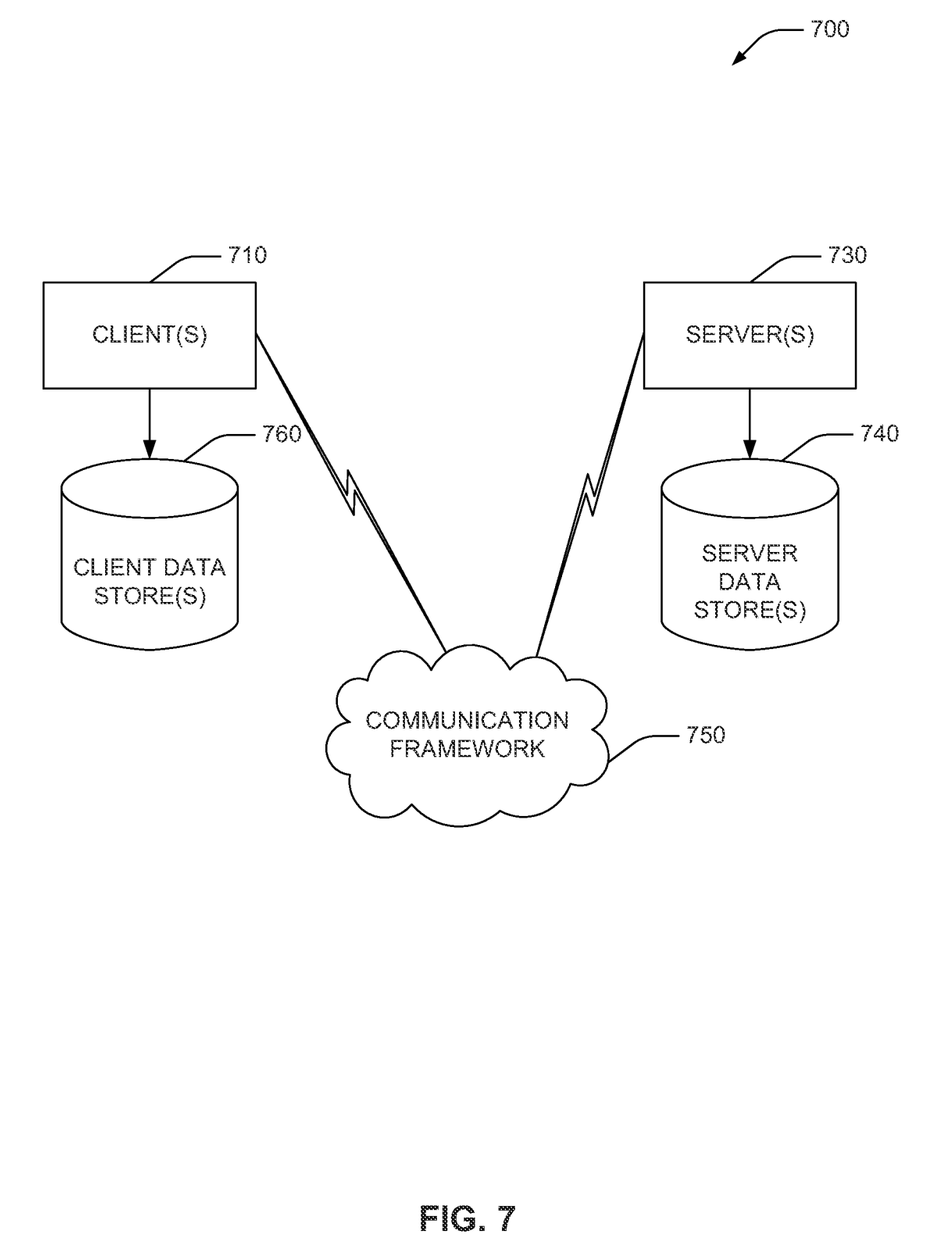
FIG. 7 is an aspect of an example communication environment in accordance with aspects described herein.

To provide a context for the various aspects of the disclosed subject matter, FIGS. 6 and 7 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, tablet, watch...), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 6, an exemplary environment 600 for implementing various aspects disclosed herein includes a computer 612 (e.g., desktop, laptop, server, hand held, programmable consumer or industrial electronics...). The computer 612 includes a processing unit 614, a system memory 616 and a system bus 618. The system bus 618 couples system components including, but not limited to, the system memory 616 to the processing unit 614. The processing unit 614 can be any of various available microprocessors. It is to be appreciated that dual microprocessors, multi-core and other multiprocessor architectures can be employed as the processing unit 614.

The system memory 616 includes volatile and nonvolatile memory. The basic input/output system (BIOS), containing the basic routines to transfer information between elements within the computer 612, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 612 also includes removable/non-removable, volatile/non-volatile computer storage media. FIG. 6 illustrates, for example, mass storage 624. Mass storage 624 includes, but is not limited to, devices like a magnetic or optical disk drive, floppy disk drive, flash memory or memory stick. In addition, mass storage 624 can include storage media separately or in combination with other storage media.

FIG. 6 provides software application(s) 628 that act as an intermediary between users and/or other computers and the basic computer resources described in suitable operating environment 600. Such software application(s) 628 include one or both of system and application software. System software can include an operating system, which can be stored on mass storage 624, that acts to control and allocate resources of the computer system 612. Application software takes advantage of the management of resources by system software through program modules and data stored on either or both of system memory 616 and mass storage 624.

The computer 612 also includes one or more interface components 626 that are communicatively coupled to the bus 618 and facilitate interaction with the computer 612. By way of example, the interface component 626 can be a port (e.g., serial, parallel, PCMCIA, USB, FireWire...) or an interface card (e.g., sound, video, network...) or the like. The interface component 626 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 612 to output device(s) via interface component 626. Output devices can include displays (e.g., cathode ray tube (CRT), liquid crystal display (LCD), light emitting diode (LCD), plasma...), speakers, printers and other computers, among other things.

According to an example, computer 612 can perform the presence server, proxy server, UA, PUA, registrar, etc. functionality, or other functionality, as described herein. In this example, the processing unit(s) 614 can comprise or receive instructions related to managing subscriptions for UAs to other UAs, providing published events to the subscribing UAs, receiving events of UAs, providing the events to presence servers, and/or other aspects described herein. It is to be appreciated that the system memory 616 can additionally or alternatively store such instructions and the processing unit(s) 614 can be utilized to process the instructions.

FIG. 7 is a schematic block diagram of a sample-computing environment 700 with which the subject innovation can interact. The environment 700 includes one or more client(s) 710. The client(s) 710 can be hardware and/or software (e.g., threads, processes, computing devices). The environment 700 also includes one or more server(s) 730. Thus, environment 700 can correspond to a two-tier client server model or a multi-tier model (e.g., client, middle tier server, data server), amongst other models. The server(s) 730 can also be hardware and/or software (e.g., threads, processes, computing devices). The servers 730 can house threads to perform transformations by employing the aspects of the subject innovation, for example. One possible communication between a client 710 and a server 730 may be in the form of a data packet transmitted between two or more computer processes.

The environment 700 includes a communication framework 750 that can be employed to facilitate communications between the client(s) 710 and the server(s) 730. Here, the client(s) 710 can correspond to program application components and the server(s) 730 can provide the functionality of the interface and optionally the storage system, as previously described. The client(s) 710 are operatively connected to one or more client data store(s) 760 that can be employed to store information local to the client(s) 710. Similarly, the server(s) 730 are operatively connected to one or more server data store(s) 740 that can be employed to store information local to the servers 730.

By way of example, one or more clients 710 can include UAs, and server(s) 730 can include various components of a distributed SIP architecture (e.g., a presence server, PUA, registrar, proxy server, etc.), which can communicate via communication framework 750. The client(s) 710 can subscribe to receive events of other clients via communication framework. The server data store(s) 740, for example, can include DHTs, local storage, etc., described herein for example.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise random access memory (RAM), read-only memory (ROM), electrically erasable programmable ROM (EEPROM), compact disc (CD)-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While one or more aspects have been described above, it should be understood that any and all equivalent realizations of the presented aspects are included within the scope and spirit thereof. The aspects depicted are presented by way of example only and are not intended as limitations upon the various aspects that can be implemented in view of the descriptions. Thus, it should be understood by those of ordinary skill in this art that the presented subject matter is not limited to these aspects since modifications can be made. Therefore, it is contemplated that any and all such embodiments are included in the presented subject matter as may fall within the scope and spirit thereof.

What is claimed is:

1. A system for subscribing to receive published events in a distributed session initiation protocol (SIP) network, the system comprising:
   a presence server comprising:
     a local storage;
     a memory configured to store one or more instructions; and
     a processor that when executing the one or more instructions is configured to:
       receive a request from an event subscribing user agent (UA) to subscribe to receive a certain event of another UA;
       store information regarding the event subscribing UA, the certain event, and the another UA in the local storage to facilitate communication with the event subscribing UA;
       store the information regarding the event subscribing UA, the certain event, and the another UA in a global storage accessible to a plurality of presence servers in the SIP network;
       resolve a conflict between the information stored in the local storage and the information stored in the global storage based on a comparison of a time stamp associated with the information stored in the local storage and a time stamp associated with the information stored in the global storage;
       aggregate the resolved information;
       remove timestamps associated from the aggregated resolved information; and
       send the aggregated resolved information without associated timestamps to the event subscribing UA.

2. The system of claim 1, wherein the processor is further configured to:
   receive event information from a presence UA related to an event of the another UA.

3. The system of claim 1, wherein the processor is further configured to:
   determine that the event subscribing UA is subscribed to receive published events of the another UA based at least in part on querying the local storage; and
   cause event information of the another UA to be sent to the event subscribing UA.

4. The system of claim 3, wherein the processor is further configured to:

cause the event information to be sent to the event subscribing UA based at least in part on receiving the event information from a presence UA of the another UA.

5. The system of claim 1, wherein the information regarding the event subscribing UA stored in the global storage comprises:
an identifier of a presence server related to the event subscribing UA.

6. The system of claim 1, wherein the event subscribing UA and the another UA access the SIP network using different proxy servers.

7. A method comprising:
receiving, by a hardware-implemented presence server, a request from an event subscribing user agent (UA) to subscribe to receive a certain event of another UA;
storing, by the hardware-implemented presence server, information regarding the event subscribing UA, the certain event, and the another UA in the local storage to facilitate communication with the event subscribing UA;
storing, by the hardware-implemented presence server, the information regarding the event subscribing UA, the certain event, and the another UA in a global storage accessible to a plurality of presence servers in the SIP network;
resolving, by the hardware-implemented presence server, a conflict between the information stored in the local storage and the information stored in the global storage based on a comparison of a time stamp associated with the information stored in the local storage and a time stamp associated with the information stored in the global storage;
aggregating, by the hardware-implemented presence server, the resolved information;
removing, by the hardware-implemented presence server, timestamps associated from the aggregated resolved information; and
sending, by the hardware-implemented presence server, the aggregated resolved information without associated timestamps to the UA subscribing to the event.

8. The method of claim 7, further comprising:
receiving, by the hardware-implemented presence server, event information from a presence UA related to an event of the another UA.

9. The method of claim 7, further comprising:
determining, by the hardware-implemented presence server, that the event subscribing UA is subscribed to receive published events of the another UA based at least in part on querying the local storage; and
causing, by the hardware-implemented presence server, event information of the another UA to be sent to the event subscribing UA.

10. The method of claim 9, further comprising:
causing, by the hardware-implemented presence server, the event information to be sent to the event subscribing UA based at least in part on receiving the event information from a presence UA of the another UA.

11. The method of claim 7, wherein the information regarding the event subscribing UA stored in the global storage comprises:
an identifier of a presence server related to the event subscribing UA.

12. The method of claim 7, wherein the event subscribing UA and the another UA access the SIP network using different proxy servers.

* * * * *